May 28, 1935.  J. NIEDERHAUSER  2,002,709
TRANSMISSION MECHANISM
Filed Sept. 1, 1931  4 Sheets-Sheet 1
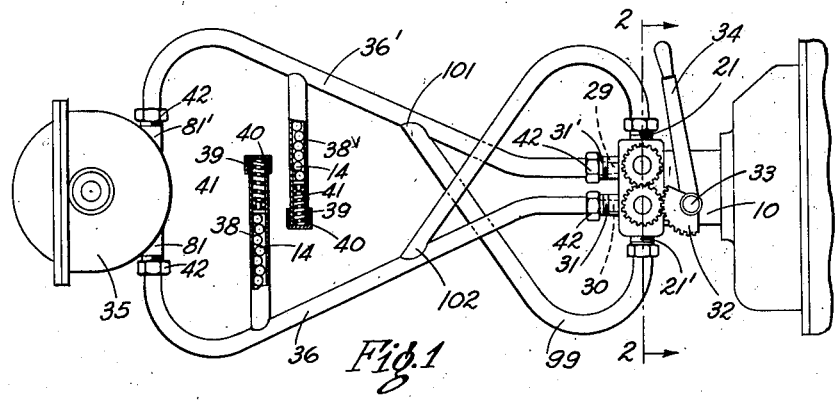
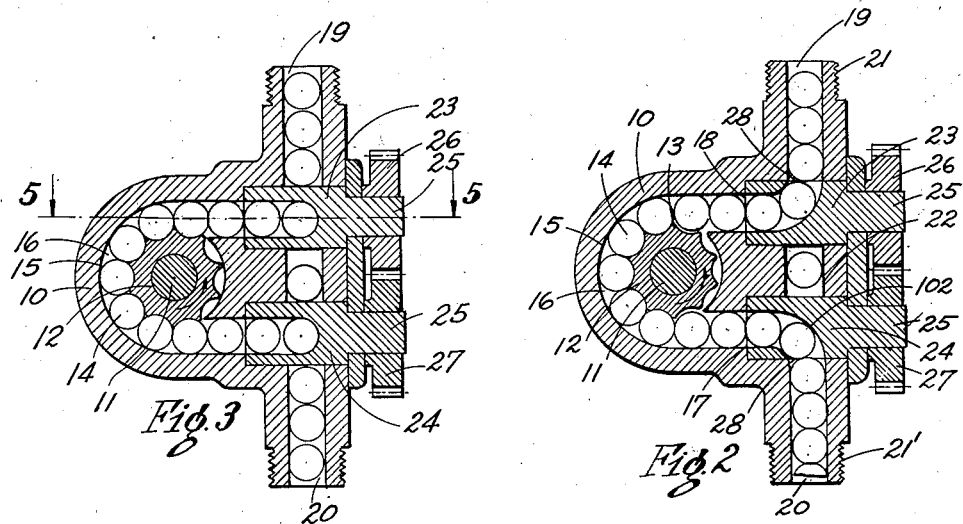
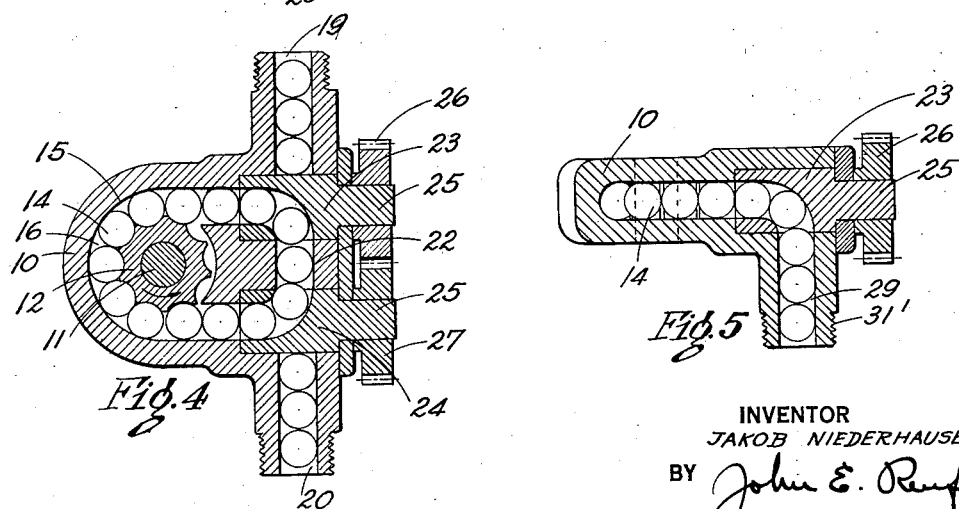
INVENTOR
JAKOB NIEDERHAUSER
BY John E. Reufer
ATTORNEY May 28, 1935.  J. NIEDERHAUSER  2,002,709
TRANSMISSION MECHANISM
Filed Sept. 1, 1931  4 Sheets-Sheet 2
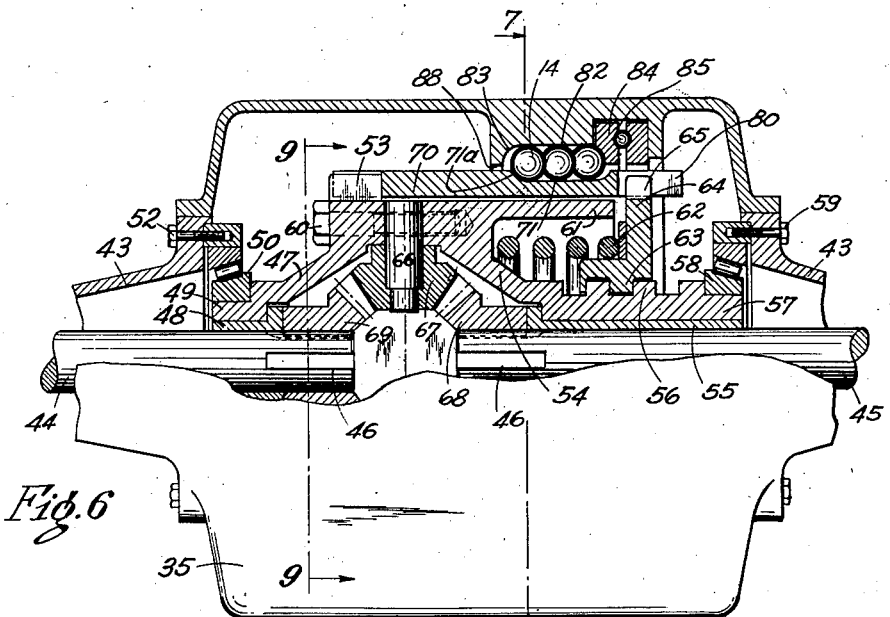
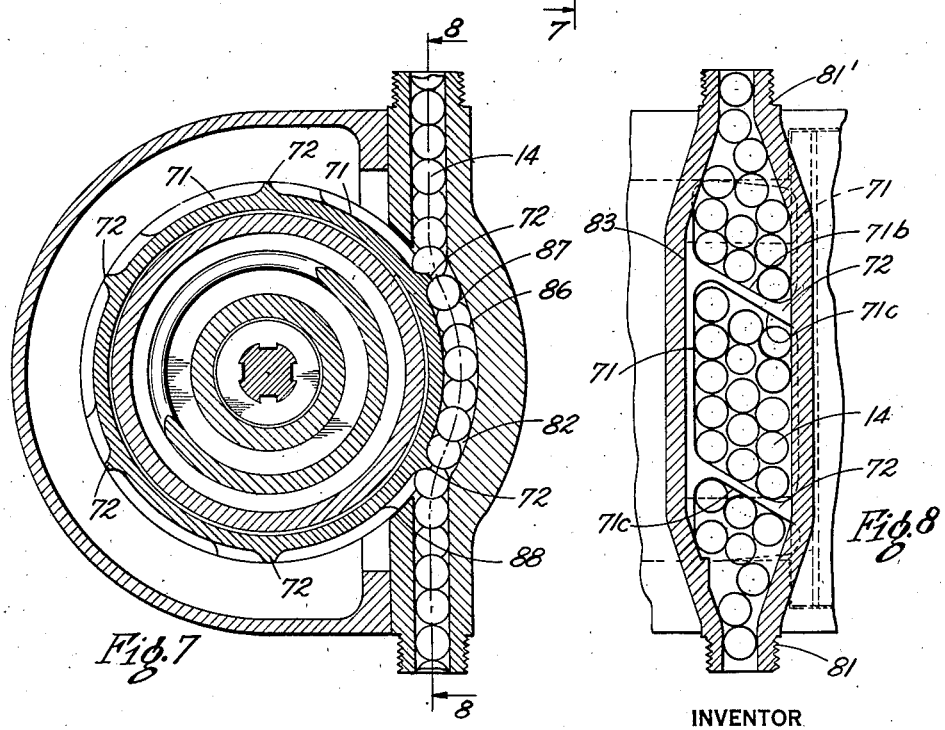
INVENTOR
JAKOB NIEDERHAUSER
BY
ATTORNEY May 28, 1935. J. NIEDERHAUSER 2,002,709

TRANSMISSION MECHANISM

Filed Sept. 1, 1931 4 Sheets-Sheet 3

INVENTOR
JAKOB NIEDERHAUSER
BY
ATTORNEY

May 28, 1935. J. NIEDERHAUSER 2,002,709
TRANSMISSION MECHANISM
Filed Sept. 1, 1931 4 Sheets-Sheet 4
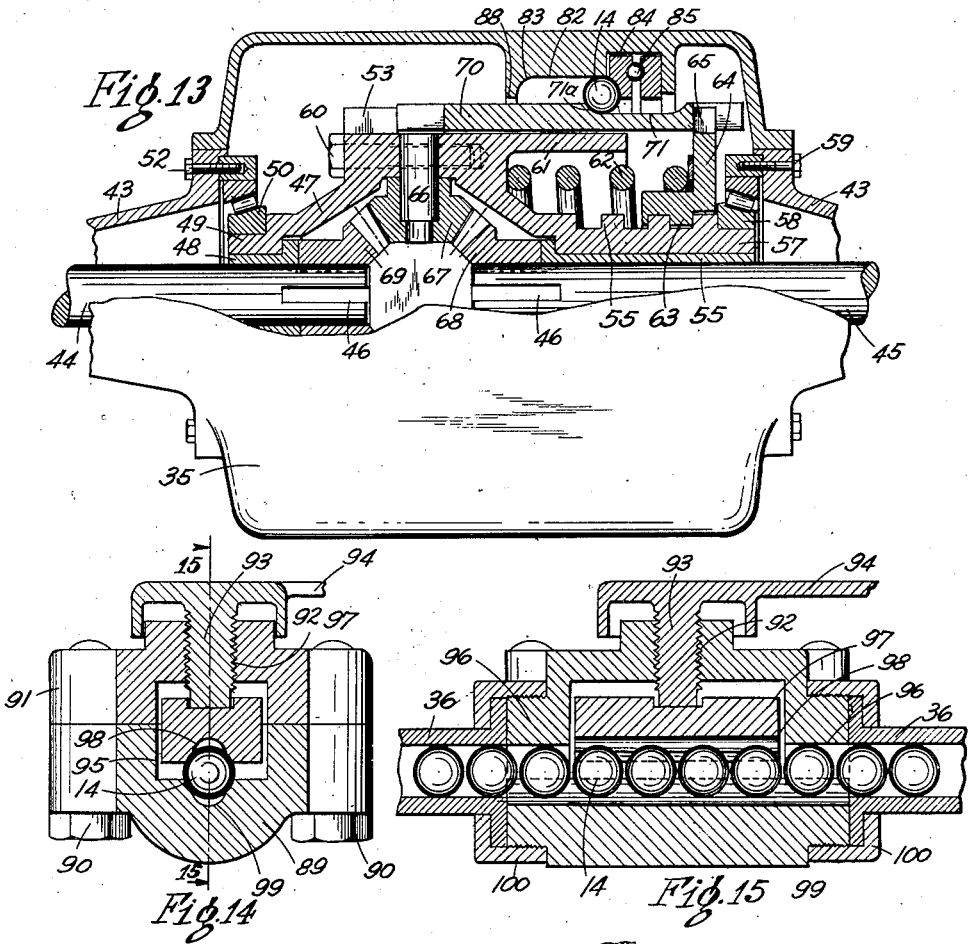

UNITED STATES PATENT OFFICE 2,002,709

TRANSMISSION MECHANISM

Jakob Niederhauser, Wettingen, Switzerland, assignor of one-half to Richard Suter, Cleveland, Ohio Application September 1, 1931, Serial No. 560,575

8 Claims. (Cl. 74—245)

The present invention relates to various improvements in transmission mechanism for motor vehicles and more particularly to a transmission mechanism in which a multi-transmission ratio is required without necessitating the constant shifting of gears to accomplish changes in speed of the driven shaft.

One object of my invention is to provide motor vehicles with a transmission mechanism deprived of the heavy and expensive cog wheels and gear shifting device, reducing thereby the weight of the vehicle and affording an easier operation.

Another object of my invention is to secure a transmission mechanism affording a smooth and flexible action similar to the one obtained by fluid transmission but eliminating the costly and impractical packing members necessitated in transmission of that type.

Other objects and advantages more or less auxiliary to the foregoing and the manner in which the various objects are attained, reside in the specific construction and grouping of the elements peculiar to this structure, as will become apparent from a more complete examination of this specification, in the claims of which there are assembled certain combinations of parts and specific constructions indicative of the scope and spirit of the invention.

In the drawings:

Figure 1 is a longitudinal view partly in section illustrating a part of a motor housing and a driven axle housing with the invention incorporated therein.

Figure 2 is a transversal sectional view taken in a plane illustrated by lines 2—2 in Figure 1.

Figures 3 and 4 are views similar to Figure 2 illustrating parts of the mechanism in different positions.

Figure 5 is a transverse sectional view taken in a plane illustrated by lines 5—5 in Figure 3.

Figure 6 is an enlarged sectional view partly in section illustrating a portion of the rear axle housing assembly.

Figure 7 is a transversal sectional view taken in a plane illustrated by the line 7—7 in Figure 6.

Figure 8 is a longitudinal sectional view taken in a plane illustrated by the line 8—8 in Figure 7.

Figure 13 is a view similar to Figure 6 with same parts in different position.

Figure 14 is a sectional transversal view illustrating one form of a braking mechanism possible with my invention.

Figure 15 is a longitudinal view taken in a plane illustrated by line 15—15 in Figure 14.

Figure 16 is an enlarged sectional view illustrating the position of the balls within the conduit.

Figure 17 is an enlarged view showing the different position of the hand operated lever.

Figure 9:
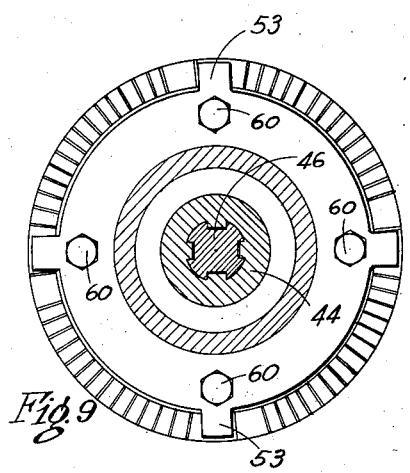
Figure 9 is a sectional view taken in a plane illustrated by the line 9—9 in Figure 6 and looking in the direction of the arrows.

Referring now to the drawings in which like symbols designate corresponding parts throughout the several views, there is shown a housing 10 having a shaft 11 rotatably mounted therein. This shaft may be connected to a motor by any suitable means. The shaft 11 being coupled to a motor will hereafter be denoted as driving shaft or primary unit. Mounted upon the driving shaft 11, there is a gear 12 formed with a plurality of selectively designed teeth 13, engageable with the pressure bodies or balls 14. The housing 10 is manufactured to provide an internal semi-circular wall 15, producing with the bottom of the teeth 13, a canal 16 of a diameter somewhat larger than the diameter of the balls 14. Disposed in axial alignment through the housing 10, there are two passages 19 and 20 located adjacent to the ends 17 and 18 of the canal 16. Disposed concentrically with the passages 19 and 20, and adjacent to the ends thereof, the housing 10 is formed with two external screw threaded portions 21 and 21'. Intermediate the passages 19 and 20, there is a connecting passage 22. Intersecting said last mentioned passages, there are two cylindrical members or governors 23 and 24 rotatably mounted within the housing 10, and having extending shanks 25 fitted to receive the meshing gears 26 and 27. The governors 23 and 24 are formed with cylindrical passages 28 having their opening disposed at right angles from each other. The housing 10 is provided with two other conduits 29 and 30, which are in communication with the governors 23 and 24. The external wall of these conduits are terminated by a screw threaded portion 31 and 31'.

The rotation of the gear 26 and 27 may be effected in any suitable manner as for instance by the means of a gear segment 32 rotatably mounted upon a stationary shaft 33, and operable by a hand lever 34. Connecting the primary unit 11 to the rear axle 35, which will hereafter be denoted as driven or secondary unit, there is a system of hollow conduit 36, filled with pressure bodies or balls 14, circulating therein at the will of the operator as will hereafter be explained. The system of conduits is provided with ball reservoirs 38, connected thereto in a manner similar to the one illustrated in Fig. 16. These reservoirs are terminated by a screw threaded portion 39, adapted to receive a screw threaded cap 40, against which there is seated one end of a compression spring 41 which has its other end engaged over the last ball in the reservoir, the purpose of which will be explained later. The different conduits or tubings of the system can be secured to the primary and secondary units by any suitable means, as for instance a screw threaded coupling 42.

Secured to the casing 35, there are two tubular housings 43 having therewithin the two wheel shafts or driven shafts 44 and 45, which are terminated by a splined portion 46. Mounted upon the shaft 44, there is a wheel 47 provided with a bushing liner 48, and having a tubular hub 49, which is rotatably mounted within a roller bearing 50, secured to the tubular housing by a screw 52. The wheel 47 is provided with a plurality of radially extending portions or cams 53, the purpose of which will be explained later.

Mounted upon the shaft 45, there is a wheel 54 formed with a bushing liner 55, and provided with a screw threaded hub 56 having a cylindrical portion 57 rotatably mounted within a roller bearing 58 which is secured to the tubular housing 43 by the screws 59. The wheel 54 is integrally secured to the wheel 47 by a plurality of bolts 60, and is formed with a longitudinally extending drum 61. Intermediate the hub 56 and drum 61, the wheel 54 is formed for engagement with one end of a compression spring 62 disposed therein with its other end engaging a screw threaded nut 63 operatively mounted upon the hub 56, and provided with a radially extending flange 64 shaped with circumferentially disposed protuberances or teeth 65. The wheels 47 and 54 are adapted to receive a pressed fitted stem 66, supporting the differential gear 67, which is capable of engagement with the bevel gears 68 and 69. These gears are formed with a bore of a configuration similar to the end of the shafts 44 and 45, and engaged therein against any relative rotation.

Movably mounted upon the drum 61, there is a tubular member or gear 70, formed with circumferentially disposed cavities 71. The depth of these cavities is somewhat less than half the diameter of the pressure bodies or balls 14. Intermediate of each of said cavities, there is provided a relatively thin wall constituting a tooth 72. The gear 70 has provided upon one of its annular walls a group of denticulations 73, forming a plurality of notches 74. These notches are identical in depth, and have their bottom surface 75 in parallel vertical arrangement, with their connecting surfaces 76 formed with a portion of an inclined plane, which extends toward the center axis of the gear. Each group has its first and last notch 77 and 78 provided with an enlarged bottom surface connected to each other by an inclined wall 79. The other of the annular wall of the gear 70, is formed with a plurality of equally spaced protrusions or teeth 80, engageable with the protuberances or teeth 65.

The housing 35 is provided with screw threaded connections 81 and 81' extending in opposite direction fitted to receive the end of the conduit system 36, and being provided internally therebetween, with an enlarged groove 82 formed with an integral side wall 83 and rotatable side wall 84, formed by the ball bearing ring 85. The groove 82 is of somewhat greater depth than half the diameter of the balls 14 and is shaped with a curved internal wall 86, parallel to the circumferential wall of the gear 70, and forming with the bottom of the cavities 71 an enlarged canal 87. The gear 70 is of smaller outside diameter than the machined end walls 88 of the canal 87, thus allowing the rotation of the former into the latter.

A braking system of any suitable design can be inserted within the conduit system as illustrated in Figs. 14 and 15 in which 89 is a housing to which clamped, by the bolts 90, a cover 91 provided with a screw threaded bore 92 which is adapted to receive the screw threaded end portion or stud 93 of a hand operable lever 94. Longitudinally disposed between the housing 89 and its cover 91, there is a rectangular bore 95 being connected to the adjacent ends of the conduit 36 through the orifices 96. The bore 95 is shaped in a manner suitable to receive a brake block 97, engageable with the end of the stud 93, and is provided with a longitudinally disposed semi-circular groove 98. A groove 99 similar to the groove 98 is also provided in the housing 89 intermediate the orifices 96, forming thereby, together with the groove 98, a conduit similar to conduit 36. The housing may be secured to the conduit 36 by any suitable means, as for instance, by the connections 100.

In the operation of the mechanism, assuming the shaft 11 is being driven by any suitable power, as for instance a gasoline engine, with the coupling mechanism connecting one to the other or with any suitable clutch in the engaging position, and assuming also the lever 34 in the "B" position, as illustrated by dot and dash lines in Fig. 17, the circulation governors 23 and 24 will be positioned as illustrated in Fig. 4. The gear 12 being rotated with the shaft 11 in a counter clockwise direction and having its teeth 13 engaging the pressure bodies or balls 14, will set them in motion through the governor 24, canal 22, governor 23 and back to the gear 12. It will obviously be understood that in this position of the governors 23 and 24 the balls 14 are not circulating within the conduit 36 and therefore the rear axle or wheel shafts 44 and 45 do not rotate. Therefore, the vehicle will be in a neutral position, the engine running without imparting motion to the vehicle.

If a forward motion of the vehicle is desired, the lever 34 may be shifted in the position "A" as illustrated by full line in Fig. 17, thus rotating the circulation governor to the position illustrated in Fig. 2. Obviously the rotation imparted to the gear 12, by the motor shaft 11, will be transmitted to the balls 14, indulging thereby a circulation of the balls within the conduits 36, the balls being ejected from the connection 21' to the conduit 99, junction 101, and entering the housing 35 through the connection 81'. Within the housing 35, the balls will be forced into engagement with the gear 70, and impelling a peripheral pressure upon the teeth 72 will obviously propel the gear 70 in a clock-wise direction. Following their regular course or flow, the balls will again be ejected from the housing 35 through the connections 81, and be returned to their initial place or gear 12 by way of the conduit 36, junction 102 and conduit 21. The rotation of the gear 70 is transmitted to the nut 64 through the equally spaced teeth 80 engaging the nut's teeth 64, thus resulting in an axial displacement of the nut 63 toward the left, due to its rotation upon the thread 56 of the momentarily stationary wheel 54. In this axial displacement the spring 62 will be submitted to a greater compression, thus increasing the frictional resistance between the threads 56 and 63 sufficiently to overcome the frictional resistance or torque of the rear wheel shafts 44 and 45, affording consequently the rotation of the wheel 54 and 47, and finally the forward motion of the vehicle through the medium of the differential mechanism and shafts 44 and 45.

Figure 11:
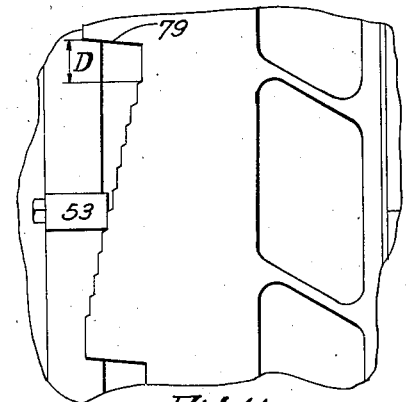
Figures 11 and 12 are views simliar to Figure 10 illustrating a portion of the transmission ratio mechanism with the parts in different position.
Figure 10:
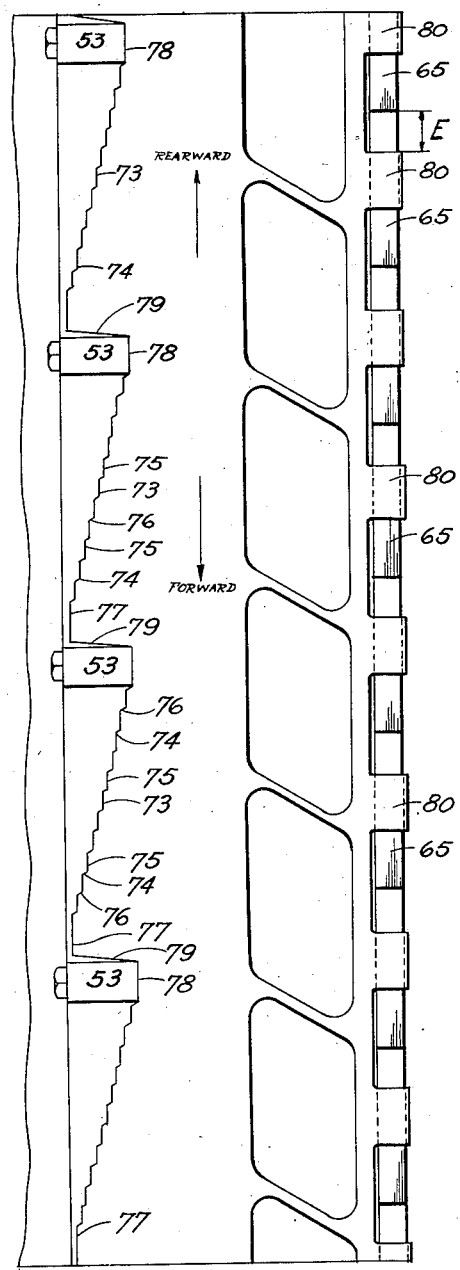
Figure 10 is a developed view of the transmission ratio mechanism.

It will obviously be understood that the gear 12 of the primary unit and the gear 70 of the secondary unit, are rigidly and forcibly connected to each other by means of the balls or pressure bodies 14, traveling within the conduits. In addition to the advantage of applying a pressure and motive transmission within the conduits between the primary and secondary units, the present invention possesses the outstanding feature of being capable to produce a great range of power transmission ratio. The gear 12 of the primary unit and the gear 70 of the secondary unit are of such a diameter as to produce a minimum transmission ratio suitable for high speed rotation with a minimum torque resistance applied to the rear axle of driven wheel. Assuming now that a greater transmission ratio is necessary as would be required to first set the vehicle in motion from a standstill position, the pressure bodies 14 will circulate within the mechanism as explained previously. However, with the gear 70 in the extreme rightward position, the conduit 82 is limited between the left side wall 71a of the cavities 71 and the rotatably but non-longitudinally movable side walls 84 of the ball bearing 85. With the gear 70 in its extreme rightward position, the conduit 82, or the width of the cavities 71 is of such a size as to maintain the balls 14 one behind the other within the cavities 71, thus affording a relative rotation of the gear 70 with respect to the cams 53. The gear 70 being rotated by the balls 14, exerting a force normal to the teeth 72, will cause the consequential rotation of the nut 64, by the respective engagement of the teeth 80 and 65. The nut 64 rotated upon the stationary bushing 57, will be displaced axially or toward the left, thus increasing the compression of a spring 62, and also increasing the frictional engagement between the threads 56 and 63. During the relative rotation of the gear 70 in respect to the cams 53, the denticulations 73 will be placed opposite the cams 53, and since the balls 14 also exert an axial force normal upon the side wall 71a of the cavities 71, the gear 70 will be moved leftwardly, thus assuring the engagement of the denticulations 73 with the cams 53 as illustrated in Fig. 11. This leftward movement of the gear 70 will effect the consequential leftward displacement of the side walls 71a, thus increasing the width of the cavities or conduit 82. The width of the cavities 82 may thus be increased until a plurality of balls come in contact with the teeth 72, or until the denticulations 73 slide over the cams 53 sufficiently to finally permit the engagement of the last land 78 with the cams 53 as illustrated in Fig. 10, thus limiting the leftward axial displacement of the gear 70. The actuating areas of the walls 71b, are proportional to the longitudinal displacement of the gear 70, and with this gear in its extreme leftward position as illustrated in Fig. 10, the actuating area of the walls 70 is at its maximum. The circumferential force applied on the teeth 72, or the rotary power imparted to the gear 70 is directly proportional to the actuating areas 71b, thus with these areas at their maximum, the rotary power of the gear 70 will also be at its maximum for a predetermined speed of the driving unit or gear 12.

Figure 12:
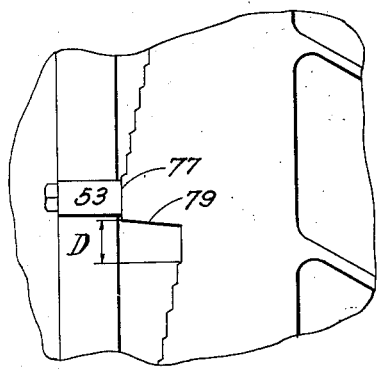

Attention is directed to the fact that the transmission ratio is directly dependent upon the torque resistance of the wheel shafts 44 and 45. If a great torque resistance is applied to these shafts, it will result in a greater compression of the spring 62 to increase the frictional resistance between the thread 56 and 63, thus allowing a large or maximum axial displacement of the gear 70. It will be observed that, if a smaller torque is applied to the shafts 44 and 45, a smaller frictional resistance between the threads 56 and 63 will be necessary, thus requiring a smaller compression of the spring 67. As explained previously, the compression of the spring 67 is obtained during the relative rotation of the gear 70 and the consequential rotation of the nut 64 with respect to the wheel 57, wheel 47, or cams 53. During this relative rotation of the gear 70, imparted thereto by the balls acting against the teeth 72 and also normal to the side wall 71a, the gear 70 will be moved leftwardly as explained previously with the denticulations 73 maintained in abutting relation with the cams 53. The leftward longitudinal displacement of the gear 70 will continue as long as there is a relative rotation of that gear with respect to the wheel 57, wheel 47, and cams 53, i. e. as long as the compression of the spring 62 is not sufficient to create enough frictional resistance between the threads 56 and 63 to overcome the torque applied to the shafts 44 and 45. With the longitudinal displacement of the gear 70, it is now understood that the areas of the walls 71b are also increased, thus augmenting the rotary power of the gear 70. The longitudinal displacement of the gear or the sliding of the notches 74 upon the cams 53 will be terminated when the spring 62 is sufficiently compressed, thus overcoming the torque applied to the shafts 44 and 45. When this occurs, the denticulations 73 may be positioned and engaged with the cams 53 as illustrated in Fig. 11. After the vehicle is set in motion and is maintained therein with an increasing speed depending upon the accelerated opening of the power motor fuel supply, the torque resistance applied to the shafts 44 and 45 will diminish requiring thereby a smaller frictional resistance between the nut 63 and the screw threaded hub 56, i. e. a smaller compression of the spring 62. The wheel 54, and consequently the wheel 47 together with the cam 53 will actually be rotated faster than the nut 64 and gear 70, thus affording a step by step engagement of the cam 53 with the denticulation 73 by sliding over the inclined wall 76 of the notches 74, resulting thereby in an axial displacement of the gear 70 toward the right and decreasing therefore the cross sectional area of the conduit 82 or reducing the actuating area of the walls 71b with a consequential reduction of the transmission ratio. When the vehicle has finally acquired a normal speed or when a normal torque resistance is applied to the shafts 44 and 45, the cam 53 will be positioned for engagement with the land 77 (see Fig. 12) reducing to a minimum the actuating areas of the walls 71b and thereby reducing the transmission ratio to a minimum.

When driving the vehicle on a decline of the road or down hill, the operator will purposely shut off or reduce the fuel supply to the engine thus reducing the rotative speed of the shaft 11, gear 12, and consequently slow the circulation of the balls 37 within the conduit system. The previously injected circumferential force to the gear teeth 71 or against the cavity walls 71b will have the tendency now to force the balls 37 out through the connection 81 imparting therefore an opposite circumferential force against the cavity walls 71c and consequently an axial force against the walls 71a and 84 tending to move the gear 70 in a direction toward the left. The nut 63, however, moved by the circumferential force previously applied thereon by the gear 70, will maintain, together with the wheel 54, wheel 47 and consequently the cam 53, its nominal rotative speed creating thereby a relative rotation between the gear 70 and the cam 53. The width "D" of the land 78 being equal or larger than the distance "E" between the gear and nut projections 80 and 65, the gear 70 will be allowed to move leftwardly when the cams 53 come in alignment or opposite the land 78 affording therefore a greater cross sectional area of the conduit 71 and increasing thereby the transmission ratio as previously explained. The self inserting high transmission ratio acts as an automatic braking device for the motor. The circumferential speed imparted by momentum to the shafts 44 and 45 will be checked by the circumferential force applied against the cavities 71c.

Should it be desired to set the vehicle in a rearward motion, the lever 34 may be moved in the "C" position as illustrated in Fig. 17, rotating thereby through the medium of the segment 32 the governors 23 and 24 in a position illustrated in Figs. 3 and 5.

The balls 14 being forced through the conduits by the gear 12 will be ejected from the connection 31 into the conduit 36, connection 81 into the housing 35, where they will engage with the gear 70 in a manner similar to the one previously described, but imparting an opposite rotation to the gear 70, inducing therefore a rearward movement to the vehicle through the shafts 54 and 55. Continuing their course or flow, the balls 37 will again be returned to their initial place or gear 12 through the connection 81', conduit 36' and connection 31' (Fig. 1).

All conduits and passages are completely filled with pressure bodies or balls 14. To assure compact packing of the conduits, one or several reservoirs 38 are disposed within the conduit circuit, each one of the reservoirs being filled with surplus balls 14 which are held under pressure exerted by the springs 41; consequently such pressure compensates for any existing play or gaps within the conduits, as well as affording a certain elasticity therein.

The braking mechanism disclosed in Fig. 14 and Fig. 15 can be operated at the will of the driver by pulling upon the lever 94 thus imparting pressure upon the balls 14 through the medium of the screw threaded stem 93 and block 97. The pressure upon several balls will be sufficient to increase any possible circulation of the balls within the conduits system thus maintaining the vehicle in any desired location.

While I have in this application specifically described one form which the invention may assume in practice, it will be understood that this form of the same is shown for purpose of illustration and that the invention may be modified and embodied in various other forms without departing from its spirit or the scope of the appended claims.

I claim:

1. In a power transmission mechanism, a primary and secondary unit, a gear rotatable within said primary unit engageable with a plurality of spheroidal bodies and capable of imparting thereto a force affording the circulation of said bodies from said primary unit to said secondary unit, guides or conduits for said bodies, a second gear within said secondary unit adapted to receive said bodies, said second gear being rotatable and axially movable by the forces imparted thereto by said pressure bodies, and means within said secondary unit capable of varying the transmission ratio between said units, said means comprising a load receiving mechanism associated with said second gear and actuable upon variations of load applied thereto for causing the axial movement of said second gear and the consequential variation of said transmission ratio.

2. A transmission mechanism comprising in combination a primary unit having a mounted shaft and a gear, a secondary unit containing a driven gear engageable with a nut, a threaded wheel and a driven shaft, the energy and motion of said driven gear being transmitted to said driven shaft by reason of the frictional resistance of said nut upon said threaded wheel, means for varying said resistance comprising a spring intermediate said wheel and nut, means for axially shifting said driven gear comprising a denticulation upon said gear engageable with a cam, and further means allowing a relative rotation of said driven gear and nut affording thereby new engagement of said denticulation upon said gear, a system of conduits filled with pressure bodies having actuated surfaces, passages within said units for said bodies, and means for increasing or decreasing the cross sectional area of said passages by the shifting of said driven gear, varying thereby the ratio transmission of said energy and motion.

3. In a transmission mechanism, a primary unit being connected to a secondary unit by a system of conduits filled with bodies having arcuated surfaces for transmitting the energy and motion from one of said units to the other, a braking mechanism within said system comprising means for restricting said conduits preventing thereby said transmission.

4. In a transmission mechanism a primary and secondary unit, a system of conduits connecting said units to each other, a plurality of balls circulating within said conduits to transmit energy and motion from one of said units to the other and a braking mechanism comprising means for preventing the circulation of said balls within said conduits.

5. In a transmission mechanism, a primary and secondary unit connected to each other by a system of conduits filled with bodies having arcuated surfaces for transmitting energy and motion from one of said units to the other, a reservoir connection with said conduits having some of said bodies in storage therein, and pressure means within said reservoir tending to forcibly eject said bodies into said conduits.

6. A transmission mechanism comprising a primary unit including a driving member, a secondary unit comprising a driven member engageable with a nut, a screw threaded wheel upon which said nut is capable of relative rotation, means for transmitting energy and motion from said driving member to said driven member and transmitting the same to said screw threaded wheel by reason of the frictional resistance of said nut thereon, and means for varying said frictional resistance.

7. A transmission mechanism comprising a primary unit including a driving member, a secondary unit comprising a driven member engageable with a nut, a screw threaded wheel upon which said nut is capable of relative rotation, a load carrying shaft drivably connected with said wheel, means for transmitting energy and motion from said driving member to said driven member and transmitting the same to said screw threaded wheel by reason of the frictional resistance of said nut thereon and to said shaft, and means responsive to a variation of the load applied to said shaft for varying said frictional resistance.

8. A transmission mechanism comprising a primary unit including a driving member, a secondary unit comprising a driven member engageable with a driving element, a driven element capable of frictional interlocking engagement with said driving element, a load carrying shaft drivably connected with said driven element, means for transmitting energy and motion from said driving member to said driven member and transmitting the same to said driven element and to said shaft by reason of the frictional resistance of the engagement of the former with said driving element, and means responsive to a variation of the load applied to said shaft for varying said frictional resistance.

JAKOB NIEDERHAUSER.